3,215,485
NITRO DYES, THEIR PRODUCTION AND USE
Otto Senn, Arlesheim, Basel-Land, Switzerland, assignor to Sandoz Ltd. (also known as Sandoz A.G.), Basel, Switzerland
No Drawing. Filed Nov. 12, 1963, Ser. No. 323,864
Claims priority, application Switzerland, Nov. 14, 1962, 13,324/62
21 Claims. (Cl. 8—55)

It has been found that nitro dyes with good properties are obtained when a 3-nitro-4-halogenobenzenesulfonic acid amide is condensed with an aminobenzenecarboxylic acid ester. These starting compounds may be further substituted, preferably by non-water-solubilizing groups.

Esters of the 4-aminosulfonyl-2-nitro-1,1'-diphenylamino-2'-, -3'- or -4'-carboxylic acid, obtained by the above mentioned condensation reaction, are particularly good as disperse dyes for the dyeing of secondary cellulose acetate or cellulose triacetate, or especially of linear aromatic polyesters from aqueous preparations. Being free of water-solubilizing groups they can also be used for the coloration of natural or synthetic resins or plastics or their solutions, of drying oils, viscose, rubber or paper pulp. The dyeings and colorations obtained are outstandingly stable to heat setting and show good fastness to light, washing, water, perspiration, pleating, boiling, acids, alkalis, gas fumes and rubbing. The dyeings on textile fibres are dischargeable. The dyes are suitable for the production of green, brown and grey combination shades using blue anthraquinone dyes as combination elements; these combination dyeings are not subject to catalytic fading.

Preferred dyes of this type are those of the general formula

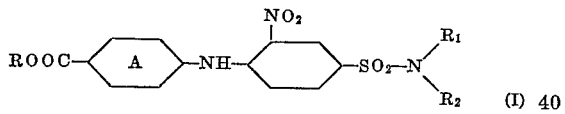

(I)

wherein
R represents an aliphatic radical with 1–6 carbon atoms,
R₁ represents a substituted or unsubstituted hydrocarbon radical, and R₂ represents a hydrogen atom or a substituted or unsubstituted hydrocarbon radical, or
R₂ together with N and R₁ forms a ring, and
the ring A may contain further substituents, and those of the general formula

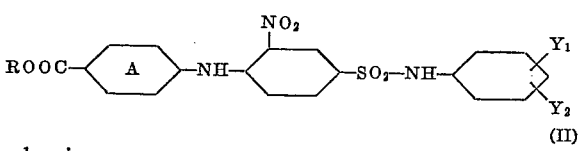

(II)

wherein
R represents an aliphatic radical with 1–6 carbon atoms,
Y₁ and Y₂ each represent a hydrogen, chlorine or bromine atom, and
the ring A may contain further substituents.

3-nitro-4-halogenobenzenesulfonic acid amides which are especially suitable are those of the formula

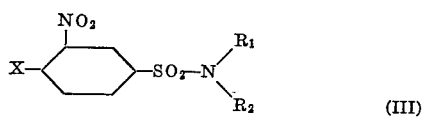

(III)

wherein X represents a halogen atom, more particularly a chlorine or bromine atom, R₁ represents a substituted or unsubstituted hydrocarbon radical, and R₂ represents a hydrogen atom or a substituted or unsubstituted hydrocarbon radical, or R₂ together with N and R₁ forms a ring.

Sulfonamides of the aforenamed type which are either monosubstituted by aryl on the nitrogen atom or mono- or disubstituted by alkyl on the nitrogen atom are preferably used. In N-monophenylsulfonamides the phenyl nucleus can be substituted, e.g. by halogen atoms, so that the components used have the formula

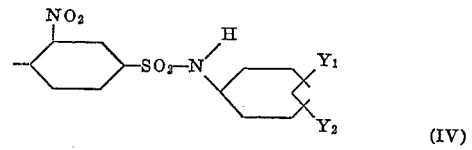

(IV)

wherein X represents a chlorine or bromine atom and Y₁ and Y₂ each represent a hydrogen, chlorine or bromine atom.

In N-alkyl substituted sulfonamides the alkyl radicals are preferably of low molecular weight, i.e. they generally contain not more than 4 carbon atoms. They can be substituted, e.g. by halogen atoms or hydroxyl, alkoxy or cyan groups. Sulfonamides having unsaturated N-alkyl radicals can also be used.

The aminobenzenecarboxylic acid ester used as second component is preferably an ester of a 4-aminobenzoic acid with the formula

(V)

wherein R represents an aliphatic radical with 1–6 carbon atoms and the ring A may be substituted, e.g. by low-molecular alkyl groups, preferably in the 2-position to the amino group.

Especially valuable dyes correspond to the formula

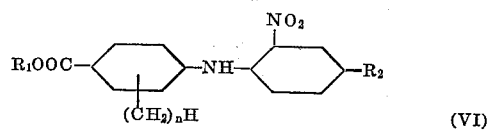

(VI)

wherein
R₁ represents an alkyl radical containing from 1 to 6 carbon atoms,
R₂ represents a secondary to tertiary sulfonic acid amide group, and
n represents a whole number from 0 to 1.

among these may be mentioned a subgroup of the formula

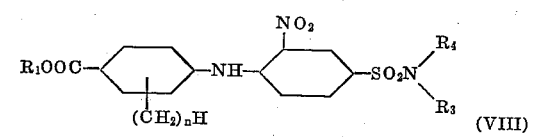

(VIII)

wherein
R₁ represents an alkyl radical containing from 1 to 6 carbon atoms,
R₃ represents a member selected from the group consisting of alkyl, monochloro alkyl, monohydroxy alkyl and mono cyano alkyl radical containing from 1 to 6 carbon atoms and of cyclohexyl, phenyl, mono-, di- and trimethyl phenyl and mono- and dichlorophenyl,
R₄ represents a member selected from the group consisting of hydrogen, alkyl, monochloro, alkyl, monohydroxy alkyl and mono cyano alkyl radical containing from 1 to 6 carbon atoms and of cyclohexyl, phenyl, mono-, di- and trimethyl phenyl and mono- and dichlorophenyl, and
n represents a whole number from 0 to 1.

In the examples the parts and percentages are by weight and the temperatures are in degrees centigrade.

Example 1

A mixture of 31 parts of 4-chloro-3-nitrobenzene-1-sulfonic acid phenyl amide, 16.5 parts of 4-aminobenzoic acid ethyl ester and 100 parts of crystallized sodium acetate is melted and heated for 10 hours at an oil bath temperature of 150–160° with stirring and reflux. Subsequently, the yellow melt formed is extracted with 400 parts of hot water. The precipitated dye can be re-crystallized from solution in ethanol. It is then obtained as a yellow crystalline powder of melting point 145°. It is suitable for dyeing linear aromatic polyester fibers from aqueous dispersion by heating to 100°, maintaining at this temperature for one hour, rinsing and drying. The greenish yellow dyeing obtained has excellent stability to heat setting.

The 4-aminobenzoic acid ethyl ester can be replaced by 15 parts of 4-aminobenzoic acid methyl ester to give a dye of melting point 175° which has similar properties.

Example 2

A mixture of 26.5 parts of 4-chloro-3-nitrobenzene-1-sulfonic acid ethylamide, 16.5 parts of 4-aminobenzoic acid ethyl ester, 50 parts of anhydrous sodium acetate and 500 parts of absolute ethanol is stirred for 24 hours at a temperature of 130° in an enameled autoclave. The cold, yellow reaction mass is filtered free from precipitated sodium chloride and the dye is isolated by distillation of the ethanol. The properties of its greenish yellow dyeings on polyester fibers are similar to those of the dye obtained in Example 1.

Example 3

32 parts of 4-chloro-3-nitrobenzene-1-sulfonic acid n-hexylamide, 16.5 parts of 4-aminobenzoic acid ethyl ester, 50 parts of calcium carbonate and 3 parts of a dispersing agent are entered into 500 parts of water and boiled with reflux for 8 hours. On cooling, the precipitated dye is filtered off and if necessary purified by recrystallization.

Example 4

32 parts of 4-chloro-3-nitrobenzene-1-sulfonic acid n-hexylamide, 15 parts of 4-aminobenzoic acid methyl ester and 80 parts of crystallized sodium acetate are mixed and heated for 24 hours at an oil bath temperature of 150–160° with stirring and reflux. The cold melt is mixed with 400 parts of hot water and the precipitated dye is recrystallized from methanol solution. Its properties are similar to those of the dyes obtained in the foregoing examples.

The dyes listed in the following table are produced by one of the procedures described above:

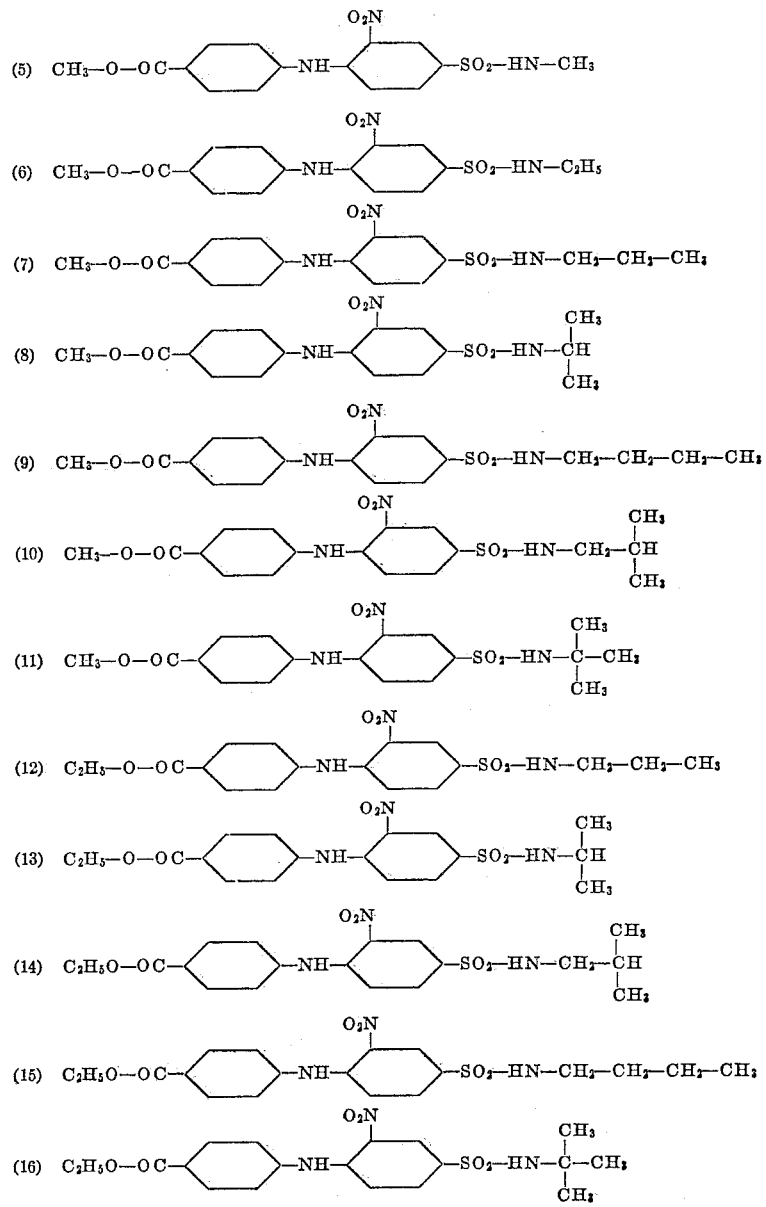

(17) (CH₃)₂CH—O—OC—⟨⟩—NH—⟨⟩(O₂N)—SO₂—HN—CH₃

(18) (CH₃)₂CH—O—OC—⟨⟩—NH—⟨⟩(O₂N)—SO₂—HN—C₂H₅

(19) (CH₃)₂CH—O—OC—⟨⟩—NH—⟨⟩(O₂N)—SO₂—HN—CH₂—CH₂—CH₃

(20) (CH₃)₂CH—O—OC—⟨⟩—NH—⟨⟩(O₂N)—SO₂—HN—CH(CH₃)₂

(21) (CH₃)₂CH—O—OC—⟨⟩—NH—⟨⟩(O₂N)—SO₂—HN—CH₂—CH₂—CH₂—CH₃

(22) (CH₃)₂CH—O—OC—⟨⟩—NH—⟨⟩(O₂N)—SO₂—NH—CH₂—CH(CH₃)₂

(23) (CH₃)₂CH—O—OC—⟨⟩—NH—⟨⟩(O₂N)—SO₂—HN—C(CH₃)₃

(24) (CH₃)₂CHO—O—OC—⟨⟩—NH—⟨⟩(O₂N)—SO₂—NH—CH₂—CH₂—CH₂—CH₂—CH₂—CH₃

(25) CH₃—CH₂—CH₂O—OC—⟨⟩—NH—⟨⟩(O₂N)—SO₂—HN—CH₃

(26) CH₃—CH₂—CH₂O—OC—⟨⟩—NH—⟨⟩(O₂N)—SO₂—HN—C₂H₅

(27) CH₃—CH₂—CH₂O—OC—⟨⟩—NH—⟨⟩(O₂N)—SO₂—HN—CH₂—CH₂—CH₃

(28) CH₃—CH₂—CH₂O—OC—⟨⟩—NH—⟨⟩(O₂N)—SO₂—HN—CH(CH₃)₂

(29) CH₃—CH₂—CH₂O—OC—⟨⟩—NH—⟨⟩(O₂N)—SO₂—HN—CH₂—CH₂—CH₂—CH₃

(30) CH₃—CH₂—CH₂O—OC—⟨⟩—NH—⟨⟩(O₂N)—SO₂—HN—CH₂—CH(CH₃)₂

(31) CH₃—CH₂—CH₂—O—OC—⟨⟩—NH—⟨⟩(O₂N)—SO₂—HN—C(CH₃)₃

(32) CH₃—CH₂—CH₂—O—OC—⟨⟩—NH—⟨⟩(O₂N)—SO₂—HN—CH₂—CH₂—CH₂—CH₂—CH₂—CH₃

(33) C₂H₅—O—OC—⟨⟩—NH—⟨⟩(O₂N)—SO₂—NH—CH₂—CH=CH₂

(34) C₂H₅—O—OC—⟨⟩—NH—⟨⟩(O₂N)—SO₂—NH—CH₂—CH₂—CH₂—O—CH₃

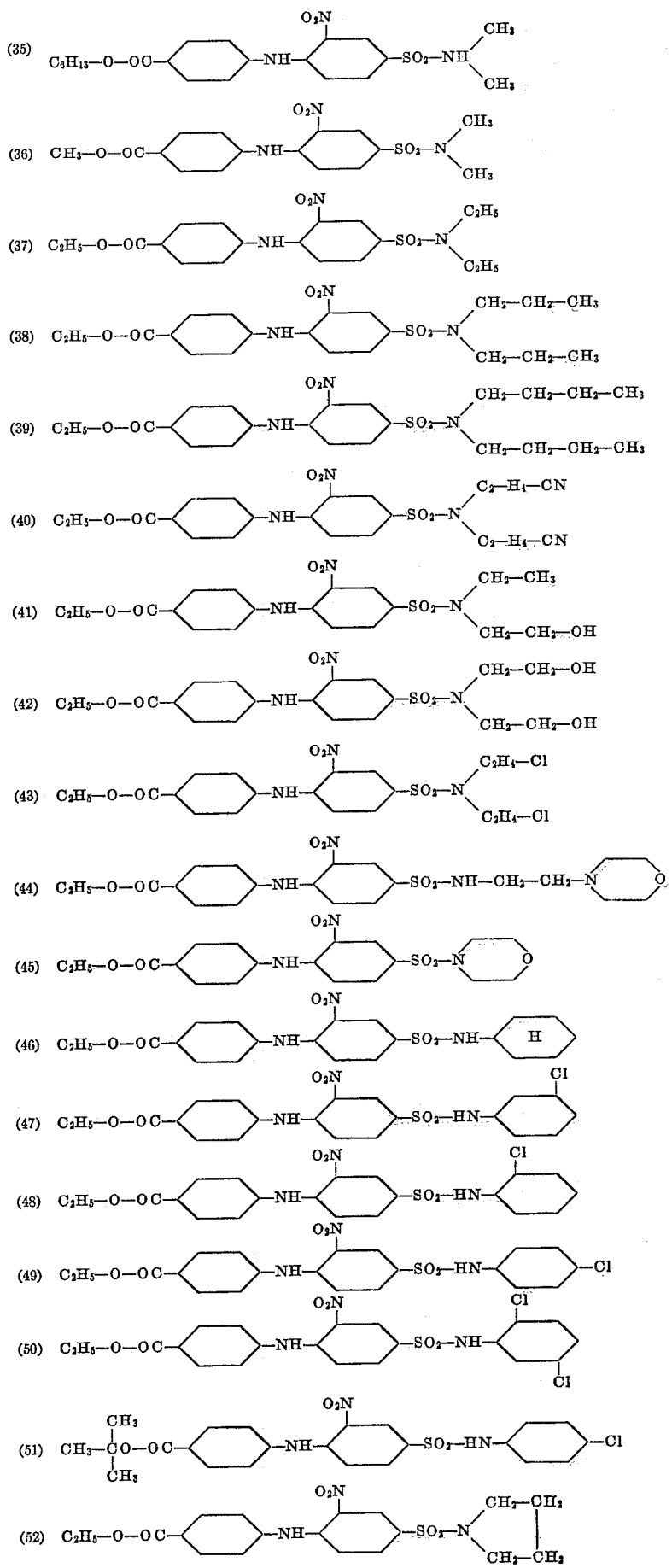

(53) $C_2H_5-O-OC-\langle\text{C}_6H_3(CH_3)\rangle-NH-\langle\text{C}_6H_3(O_2N)\rangle-SO_2-HN-\langle\text{C}_6H_5\rangle$

(54) $C_2H_5-O-OC-\langle\text{C}_6H_3(CH_3)\rangle-NH-\langle\text{C}_6H_3(O_2N)\rangle-SO_2-HN-CH_3$

(55) $C_2H_5-O-OC-\langle\text{C}_6H_3(CH_3)\rangle-NH-\langle\text{C}_6H_3(O_2N)\rangle-SO_2-HN-C_2H_5$

(56) $C_2H_5-O-OC-\langle\text{C}_6H_3(CH_3)\rangle-NH-\langle\text{C}_6H_3(O_2N)\rangle-SO_2-HN-CH_2-CH_2-CH_3$

(57) $C_2H_5-O-OC-\langle\text{C}_6H_3(CH_3)\rangle-NH-\langle\text{C}_6H_3(O_2N)\rangle-SO_2-HN-CH(CH_3)_2$

(58) $C_2H_5-O-OC-\langle\text{C}_6H_3(CH_3)\rangle-NH-\langle\text{C}_6H_3(O_2N)\rangle-SO_2-HN-CH_2-CH_2-CH_2-CH_3$

(59) $C_2H_5-O-OC-\langle\text{C}_6H_3(CH_3)\rangle-NH-\langle\text{C}_6H_3(O_2N)\rangle-SO_2-HN-CH_2-CH(CH_3)_2$

(60) $C_2H_5-O-OC-\langle\text{C}_6H_3(CH_3)\rangle-NH-\langle\text{C}_6H_3(O_2N)\rangle-SO_2-HN-C(CH_3)_3$

(61) $C_2H_5-O-OC-\langle\text{C}_6H_3(CH_3)\rangle-NH-\langle\text{C}_6H_3(O_2N)\rangle-SO_2-HN-CH_2-CH_2-CH_2-CH_2-CH_2-CH_3$

(62) $C_2H_5-O-OC-\langle\text{C}_6H_3(CH_3)\rangle-NH-\langle\text{C}_6H_3(O_2N)\rangle-SO_2-HN-\langle\text{C}_6H_4\rangle-CH_3$

(63) $C_2H_5-O-OC-\langle\text{C}_6H_3(CH_3)\rangle-NH-\langle\text{C}_6H_3(O_2N)\rangle-SO_2-HN-\langle\text{C}_6H_4(CH_3)\rangle$

(64) $C_2H_5-O-OC-\langle\text{C}_6H_3(CH_3)\rangle-NH-\langle\text{C}_6H_3(O_2N)\rangle-SO_2-HN-\langle\text{C}_6H_4(CH_3)\rangle$

(65) $C_2H_5-O-OC-\langle\text{C}_6H_3(CH_3)\rangle-NH-\langle\text{C}_6H_3(O_2N)\rangle-SO_2-HN-\langle\text{C}_6H_3(CH_3)_2\rangle$

(66) $C_2H_5O-CO-\langle\text{C}_6H_4\rangle-NH-\langle\text{C}_6H_3(O_2N)\rangle-SO_2-HN-\langle\text{C}_6H_2(CH_3)_3\rangle$ Having thus disclosed the invention what I claim is:
1. Esters of the formula

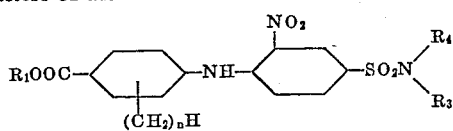

wherein
R₁ represents an alkyl radical containing from 1 to 6 carbon atoms,
R₃ represents a member selected from the group consisting of alkyl, monochloroalkyl, monohydroxyalkyl and monocyanoalkyl radicals wherein the alkyl moiety contains from 1 to 6 carbon atoms and cyclohexyl,
R₄ represents a member selected from the group consisting of hydrogen, alkyl, monochloroalkyl, monohydroxyalkyl and monocyanoalkyl radicals wherein the alkyl moiety contains from 1 to 6 carbon atoms and cycylohexyl, and
n represents a whole number of from 0 to 1.

2. The dyestuff

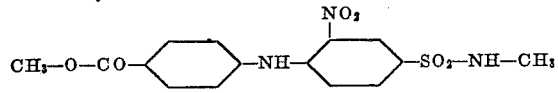

3. The dyestuff

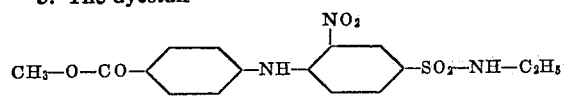

4. The dyestuff

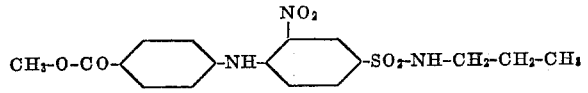

5. The dyestuff

6. The dyestuff

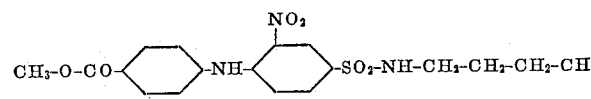

7. The dyestuff

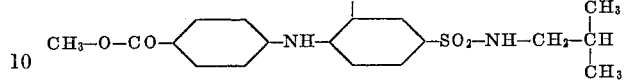

8. The dyestuff

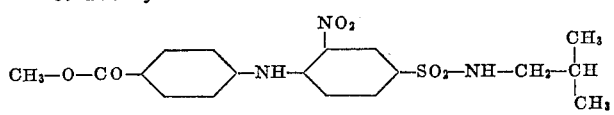

9. The dyestuff

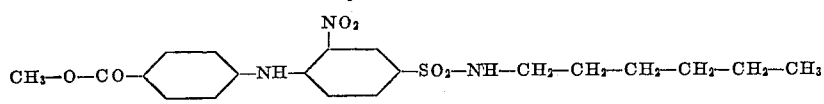

10. The dyestuff

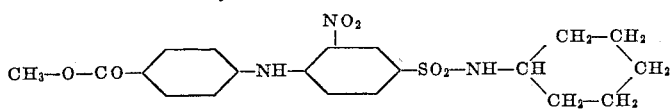

11. The dyestuff

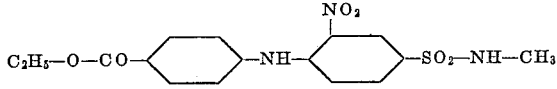

12. The dyestuff

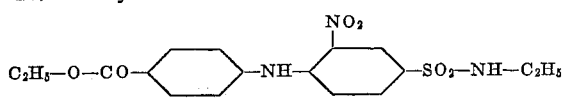

13. The dyestuff

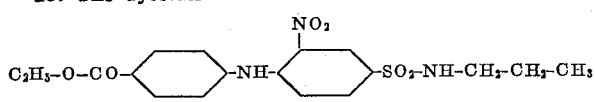

14. The dyestuff

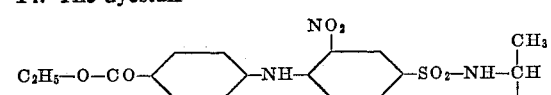

15. The dyestuff

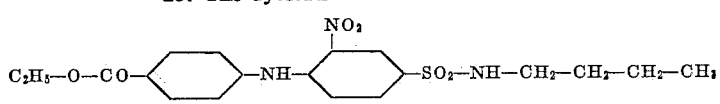

16. The dyestuff

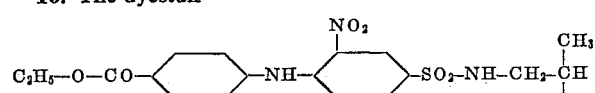

17. The dyestuff

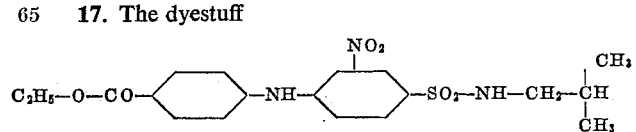

18. The dyestuff

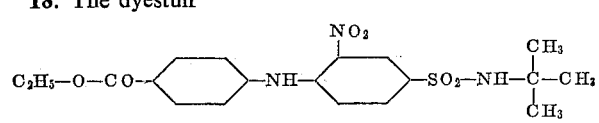

19. The dyestuff

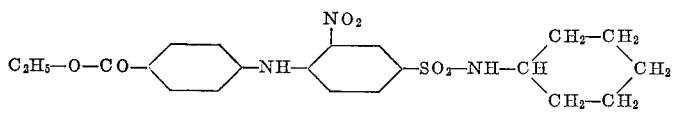

20. Process for the production of dyed fiber materials of linear aromatic polyesters which comprises impregnating the said fiber materials with an aqueous dispersion containing at least one dyestuff of the formula

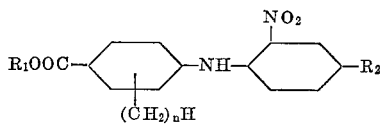

wherein
- $R_1$ represents an alkyl radical containing from 1 to 6 carbon atoms,
- $R_2$ represents a secondary to tertiary sulfonic acid amide group, and
- $n$ represents a whole number from 0 to 1.

21. Process for the production of printed fiber materials of linear aromatic polyesters which comprises impregnating the said fiber material with a printing paste containing at least one of the dyestuffs of the formula

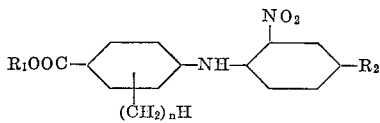

wherein
- $R_1$ represents an alkyl radical containing from 1 to 6 carbon atoms,
- $R_2$ represents a secondary to tertiary sulfonic acid amide group, and
- $n$ represents a whole number from 0 to 1.

References Cited by the Examiner

UNITED STATES PATENTS 2,921,945   1/60   Adams et al. _____ 260—397.7

NORMAN G. TORCHIN, *Primary Examiner.*

UNITED STATES PATENT OFFICE
CERTIFICATE OF CORRECTION

Patent No. 3,215,485 November 2, 1965

Otto Senn

It is hereby certified that error appears in the above numbered patent requiring correction and that the said Letters Patent should read as corrected below.

In the grant (only), line 1, for "Otto Sen" read -- Otto Senn --.

Signed and sealed this 19th day of July 1966.

(SEAL)
Attest:

ERNEST W. SWIDER
Attesting Officer

EDWARD J. BRENNER
Commissioner of Patents